No. 723,273. PATENTED MAR. 24, 1903.
T. W. HINDE.
FLUE CUTTER.
APPLICATION FILED APR. 12, 1902.
NO MODEL. 2 SHEETS—SHEET 1.
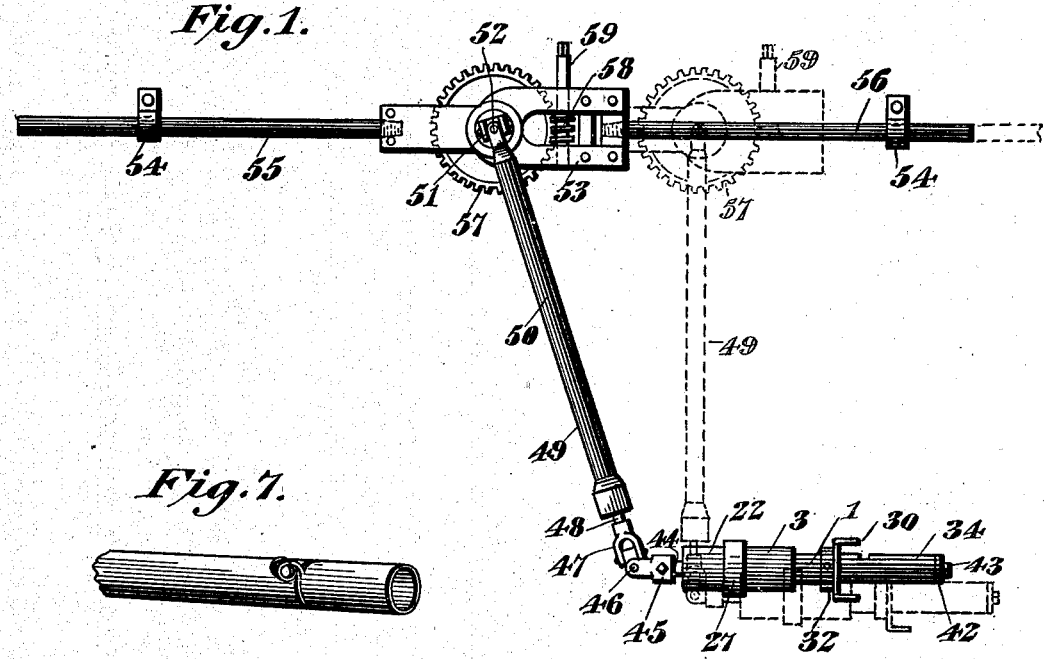
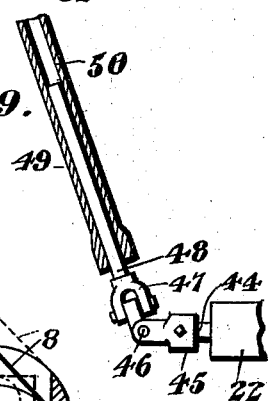
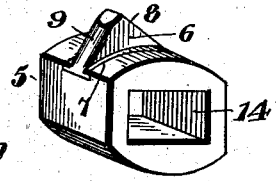
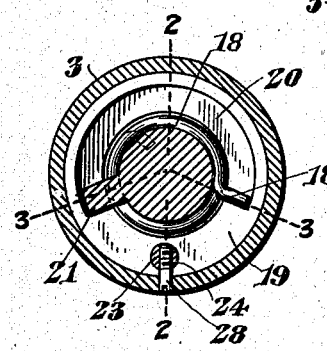
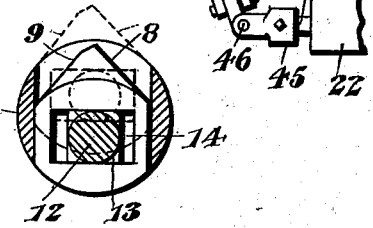
Thomas W. Hinde, Inventor
Witnesses No. 723,273. PATENTED MAR. 24, 1903.
T. W. HINDE.
FLUE CUTTER.
APPLICATION FILED APR. 12, 1902.
NO MODEL. 2 SHEETS—SHEET 2.
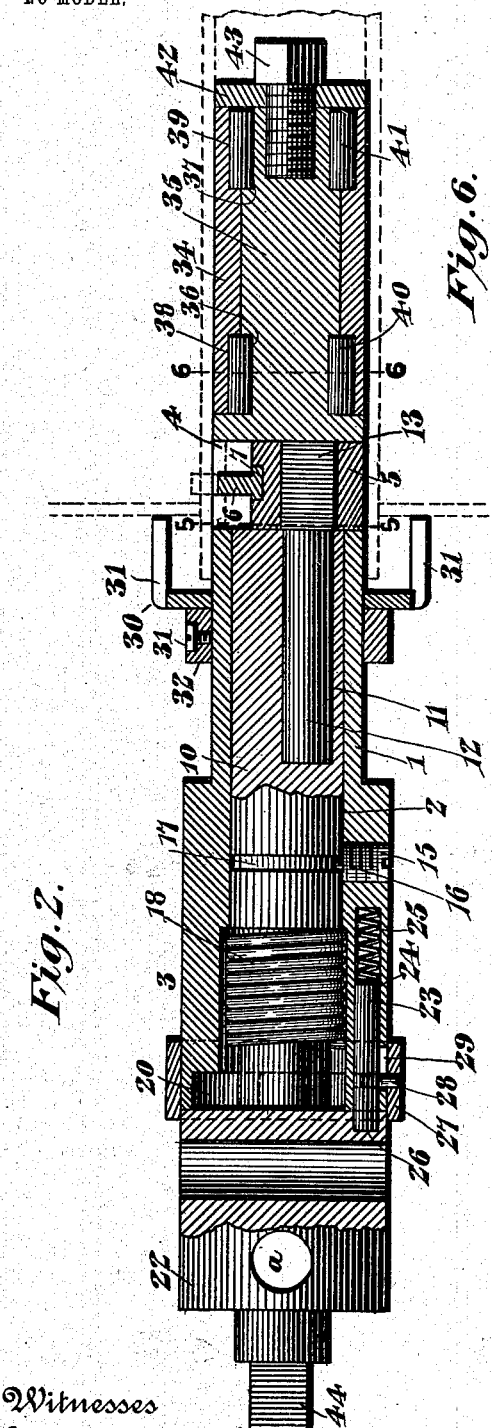
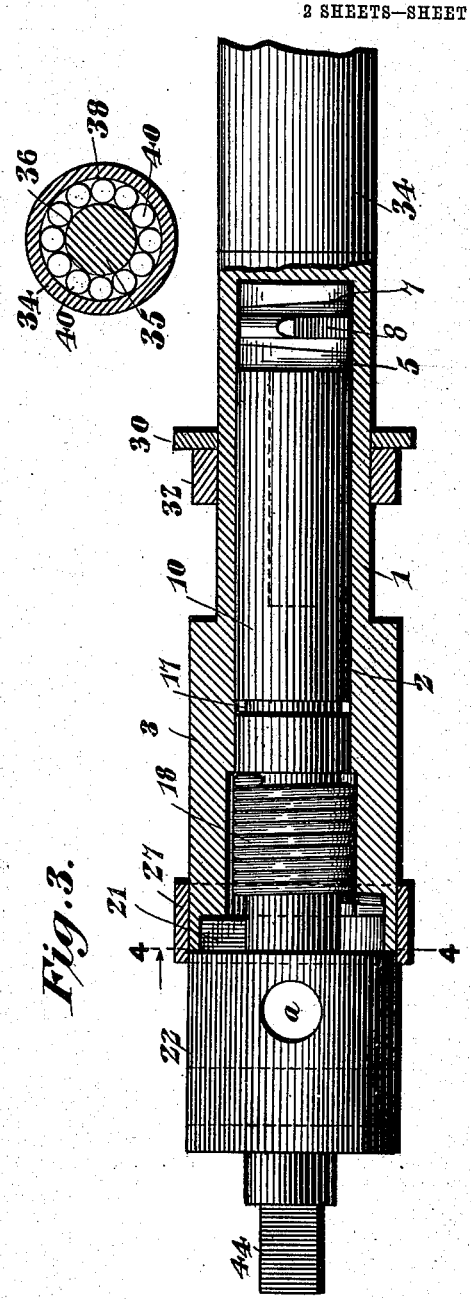
Thomas W. Hinde, Inventor

UNITED STATES PATENT OFFICE.

THOMAS W. HINDE, OF CHEROKEE, IOWA.

FLUE-CUTTER.

SPECIFICATION forming part of Letters Patent No. 723,273, dated March 24, 1903.

Application filed April 12, 1902. Serial No. 102,662. (No model.)

*To all whom it may concern:*

Be it known that I, THOMAS W. HINDE, a citizen of the United States, residing at Cherokee, in the county of Cherokee and State of Iowa, have invented a new and useful Flue-Cutter, of which the following is a specification.

This invention relates to a novel flue-cutter and its operating mechanism, the cutter being of that class which comprises a cylindrical casing designed to be inserted in the flue and having a knife connected to a spindle, which latter is first rotated independently of the casing to project the knife outwardly against the flue and is then rotated in unison with the casing to effect the cutting of the flue.

The object of the invention is to improve the construction illustrated and described in Letters Patent No. 674,553, issued to C. B. De Bolt and myself May 21, 1901.

The invention is particularly directed to the equipment of the device with a bearing-sleeve for reducing the friction between the casing and the interior of the tool, to the provision of a novel locking device for locking the casing to the spindle when it is desired to prevent the knife from moving to its cutting position, and to the improvement of the connection between the knife and the spindle.

The invention also has for its object to improve the construction of the knife and to provide operating mechanism connected to the spindle and comprehending adjustable elements which provide a substantially universal adjustment of the operating mechanism in order to accommodate the cutter to various flues in which it is intended to operate.

Subordinate to the several objects stated are others which will hereinafter more fully appear as the necessity for their accomplishment is developed in the succeeding description of that form of my invention which for the purposes of this application is illustrated in the accompanying drawings, and succinctly defined in the appended claims.

In said drawings, Figure 1 is an elevation of the cutter and its operating mechanism complete and showing an adjusted position of the parts in dotted lines. Fig. 2 is a longitudinal sectional elevation of the cutter, showing the knife thrown out in dotted lines, on the line 2 2 of Fig. 4. Fig. 3 is a view similar to Fig. 2, but taken on the line 3 3 of Fig. 4. Fig. 4 is a transverse sectional view on the line 4 4 of Fig. 3. Fig. 5 is a transverse sectional view on the line 5 5 of Fig. 2, one position of the knife being shown in dotted lines. Fig. 6 is a sectional view on the line 6 6 of Fig. 2. Fig. 7 is a detail view of one end of a cut flue. Fig. 8 is a detail view of the knife, and Fig. 9 is a detail section of the flexible connection between the cutter and operating mechanism.

Like characters of reference are employed to designate corresponding parts throughout the views.

The casing of the tool (indicated by the numeral 1) is of cylindrical form and is provided with an axial bore 2, opening through the enlarged end 3 of the casing and intersecting at its opposite end a diametrical slot 4, within which is mounted for reciprocation a knife-block 5. The movement of this knife-block, which is in a direction transverse to the casing, is designed to project beyond the casing or withdraw within the limits thereof a knife 6, having a wedge-shaped dovetailed base 7, fitting into a correspondingly-shaped recess in the knife-block 5. The form of the knife is shown in Fig. 5, the inclined cutting-face 8 being disposed at an angle with the rounded back 9 of the knife.

Normally the knife-block assumes the position shown in Fig. 2 with the knife retracted to a position within the limits of the casing, but is designed to be shifted for the purpose of projecting the knife to the position indicated in dotted lines in Fig. 2 by the rotation within the casing of a spindle 10. At the inner end of the spindle is provided a longitudinal eccentric-socket 11, within which is rotatably fitted the shank 12 of an eccentric-pin 13, the squared end of which is received within a transverse slot 14 in the knife-block 5. Obviously the rotation of the spindle within the casing will cause the shifting of the knife-block 5 to the dotted position indicated in Fig. 2, the necessary relative movement of the parts being accommodated by the movement of the eccentric-pin within the slot 14 and the rotation of the pin-shank 12 within the eccentric-socket of the spindle. Relative endwise movement of the spindle and casing is prevented by a screw-plug 15, screwed through the wall of the casing and having upon its inner end a projection or nipple 16, engaging an annular groove 17 in the spindle, said groove accommodating the rotation of the spindle within the casing to effect the projection and retraction of the knife. It will be understood that the spindle first rotates to project the knife 6 beyond the casing, and after the knife has thus been projected to its cutting position the spindle and casing will rotate in unison for the purpose of cutting the flue within which the tool has been inserted. It is therefore necessary that provision be made for retracting the knife as soon as the cut is completed in order to permit the insertion of the tool in another flue, and this is accomplished by restoring the casing and spindle to their original positions through the instrumentality of a spring 18, encircling the spindle within the casing and having one end secured to the spindle and its opposite end abutting against a segmental or arcuate lug 19, formed within the casing at the outer end thereof.

As shown in Fig. 2, the outer end of the casing is enlarged somewhat and is formed with an arcuate recess 20, into which extends a stop-lug 21, projecting radially from the spindle 10 adjacent to one end face of an enlarged spindle-head 22, which abuts against the enlarged end of the casing. The arcuate recess 20 extends from end to end of the arcuate lug 19, and as this recess is provided for the accommodation of the stop-lug 21 upon the spindle it follows that the rotary retraction of the spindle under the impulse of the spring 18 will be limited by the contact of the lug 21 of the spindle with the lug 19 of the casing. Thus as soon as the knife 6 has reached the end of its cut the spring 18, which has been wound tightly by the initial movement of the spindle incidental to the projection of the knife to its cutting position, will retract the spindle or turn the casing, as the case may be, to retract the knife within the limits of the casing and to bring the stop-lug 21 against one end face of the lug 19.

As will be hereinafter explained, it is desirable to employ the tool in connection with a constantly-operating power device or operating mechanism, and it is evident that provision should be made for preventing the accidental projection of the knife during the withdrawal of the tool from one flue and its insertion in another. This end is attained by providing a locking device which normally effects an interlocking engagement between the spindle and casing, and thus prevents such relative movement of these elements as is necessary to project the knife. Many forms of such locking mechanism might be devised; but a simple embodiment of this feature of the invention is shown in Fig. 2 and comprehends a spring-pressed locking-pin 23, slidably mounted in a pin-socket 24, formed in the casing, the spring being indicated by the numeral 25. The spring will exert a constant tendency to project the locking-pin 23 into engagement with a recess 26, formed in the inner end wall of the head 22, and when in this position the pin will effectually lock the spindle and casing against relative rotary movement.

In order to permit the operator to quickly unlock the parts when the tool has been properly positioned in a flue, I provide a locking-ring 27, surrounding the casing and inclosing the joint between said casing and the head 22 of the spindle. This ring is connected to the locking-pin 23 by means of a screw-stud 28, for the accommodation of which one wall of the pin-socket is formed with a longitudinal slot 29. Ordinarily the spindle and casing will rotate in unison under the impulse of the power mechanism, to be described, and the knife will be located in its retracted position, as shown in Fig. 2. When, however, the tool has been inserted in a flue, the operator by sliding back the locking-ring 27 will withdraw the locking-pin 23 from engagement with the spindle-head, and relative rotary movement will then be imparted to the spindle for the purpose of projecting the knife preparatory to the synchronous rotation of the spindle and casing to effect the cutting of the flue in a manner obvious to those skilled in the art.

For the purpose of properly positioning the tool within the flue in order that the cut may be made at any desired distance from the flue-sheet I provide an adjustable gage 30 in the form of an annulus slidably mounted upon the spindle and having a plurality of lugs or arms 31, extending parallel with the tool and designed to abut against the flue-sheet, as shown in Fig. 2. The position of this gage device is adjusted by means of an adjustable gage-collar 32, surrounding the casing and retained in any desired position by a set-screw 33 to constitute a backing for the gage 30. By loosening the set-screw 33 it is possible to shift the gage device to any desired position and to quickly secure the same against movement.

Another feature of the invention which is considered important resides in the provision of an antifrictional bearing-sleeve 34, surrounding the inner end of the casing substantially flush with the periphery thereof. The end of the casing surrounded by this sleeve is solid and is reduced to accommodate the latter, the reduced casing end 35 being provided adjacent to its opposite extremities with annular roller-channels 36 and 37, disposed opposite similar channels 38 and 39, formed in the face of the sleeve for the reception of annular series of rollers 40 and 41, the rollers and sleeve being retained by a disk 42, held in place by a screw-bolt 43, screwed into the end of the casing. As this bearing-sleeve 34 surrounds the greater part of the inserted end of the tool the friction incidental to the turning of the tool within the flue will be reduced to a minimum.

Having completed the description of the flue-cutter considered as a tool, I now come to the description of the operating mechanism, the manner of mounting the same, and the connection of such mechanism with the tool.

It will be noted that the spindle 10 is provided at its outer end with openings $a$ for the reception of a hand lever or bar and with a squared plug 44. This plug is designed for reception within one member 45 of a knuckle-joint 46, the other member 47 of which is formed at one end of the inner member 48 of an extensible or telescopic shaft 49, whose outer member 50 is connected by a knuckle-joint 51 with a driving-shaft 52, journaled in suitable bearings in a frame 53. The frame 53, which may be defined as the frame of the operating mechanism, is adjustably supported by suitable brackets 54, which slidably receive a pair of oppositely-extending rods 55 and 56, secured to the ends of the frame 53. By reason of the slidable mounting of these supporting-rods within the brackets 54 the frame 53 may be shifted for the purpose of accommodating the tool to various flues. Power may be communicated to the driving-shaft 52 in any suitable manner; but by preference said shaft is made to carry a worm-gear 57, meshing with a worm 58, whose shaft 59 is journaled in the frame 53 and arranged for connection with a motor of pneumatic or other type.

In operation the operating mechanism is shifted and the power-transmitting shaft 49 is extended or contracted, as the case may be, for the purpose of disposing the tool in proper position to enter a flue. The gage 30 having been properly placed, the smaller end of the casing is inserted in the flue to be cut and the locking-ring 27 is slipped back to effect the unlocking of the spindle from the casing. The spindle will now move within the casing, resisted by the spring 18, and will force the knife 6 through the wall of the flue. The casing will now be carried around with the spindle and the knife will cut the flue. As soon as the flue has been cut the spring 18 will restore the spindle and casing to their normal positions, retracting the knife and permitting the locking-pin 23 to spring back into engagement with the head of the spindle. The casing and spindle will now rotate in unison and the knife will be kept retracted until the tool has again been inserted in a flue and the casing released from the spindle by the sliding of the locking-collar 27 in the manner heretofore described.

It is thought that from the foregoing the construction and operation of my flue-cutter and its operating mechanism will be clearly comprehended; but while the present embodiment of the invention appears at this time to be preferable I do not wish to limit myself to the structural details defined, as, on the contrary, I reserve the right to effect such changes, modifications, and variations of the illustrated structure as may be suggested by experience and experiment and embraced within the scope of the protection prayed.

What I claim is—

1. In a device of the character described, the combination with a shiftably-mounted frame, and operating mechanism supported thereby, of a flue-cutter, and an extensible connection between the operating mechanism and the flue-cutter.

2. In a device of the character described, the combination with a shiftably-supported frame, and operating mechanism carried thereby, of a rotary flue-cutter, and an extensible shaft having flexible connection at its opposite ends with the operating mechanism and flue-cutter, respectively.

3. In a device of the character described, the combination with a frame, rods extending in opposite directions therefrom, and brackets slidably supporting the rods, of operating mechanism mounted in the frame, a rotary flue-cutter, and an extensible shaft connecting the flue-cutter with the operating mechanism.

4. In a device of the character described, the combination with a frame, supporting-rods extending in opposite directions therefrom, and brackets slidably receiving said rods, of a driving-shaft and a power-shaft mounted in the frame, worm-gearing connecting said shafts, a telescopic power-transmitting shaft connected by a knuckle-joint to the driving-shaft, and a rotary flue-cutter connected by a knuckle-joint to the opposite end of the power-transmitting shaft.

5. In a device of the character described, the combination with a casing having a diametrical slot, of a spindle mounted in the casing, a knife-block mounted to reciprocate within the slot and provided with a knife, and an eccentric-pin rotatable in the end of the spindle and having engagement with the knife-block to reciprocate the same.

6. In a device of the character described, the combination with a casing having a diametrical slot, and a slotted knife-block movable in the slot and provided with a knife, of a spindle extended into the casing, an eccentric-pin having a squared end engaging the slot in the knife-block, and a cylindrical shank rotatably mounted in the end of the spindle at an eccentric point, whereby the rotation of the spindle within the casing will effect the rotation of the pin-shank within the spindle, the sliding movement of the squared pin within the slot of the knife-block and the sliding of the knife-block in the slot of the casing to project the knife or effect its retraction.

7. In a device of the character described, the combination with a casing, and a spindle, of a knife disposed to be projected beyond the casing and retracted within the limits thereof through the rotation of the spindle within the casing, and a locking device for locking the casing and spindle against relative rotary movement to prevent the accidental projection of the knife.

8. In a device of the character described, the combination with a casing, a spindle therein, and a knife disposed to be moved in opposite directions by the rotation of the spindle, of a locking-collar slidable upon the casing, and a locking device arranged to lock the spindle and casing against relative movement and having connection with the locking-collar.

9. In a device of the character described, the combination with a casing, of a spindle having an enlarged head imposed against one end of the casing, said head being provided with a recess, a spring-pressed locking-pin mounted in the casing and arranged to engage the recess in the head of the spindle, and means upon the exterior of the casing for retracting the locking-pin against the resistance of its spring.

10. In a device of the character described, the combination with a casing, and a knife mounted therein and disposed to be projected laterally therefrom, of a spindle having an enlarged head imposed against one end of the casing and provided with a recess in one end face, a spring-pressed locking-pin mounted in the wall of the casing, a sliding collar inclosing the joint between the casing and spindle-head, and a stud connecting the collar with the locking-pin and working in a slot in the casing.

11. In a device of the character described, the combination with a casing having a longitudinal bore, and provided with an arcuate recess in its end face constituting a segmental enlargement of the bore, of a spindle mounted in the casing and provided with an enlarged head abutting against the recessed end of the casing, a lug projecting from the spindle and arranged to move within the recess and to bear against an arcuate lug defined between the ends of said recess, a spring resisting relative movement of the spindle and casing, and a knife mounted within the casing and operatively connected to the spindle.

12. In a device of the character described, the combination with a casing provided with an axial bore, and having an enlarged end whose end face is cut out to form an arcuate recess between the ends of which is defined an arcuate lug, said recess constituting a segmental enlargement of the bore, of a spindle mounted in the casing and having an enlarged head abutting against the recessed end of the latter, a stop-lug projecting from the spindle into the recess in the casing, a spring resisting relative rotary movement of the casing and spindle, a spring-pressed locking-pin mounted in one wall of the casing and disposed to engage the end face of the spindle-head, a sliding collar encircling the joint between the casing and spindle-head and having operative connection with the locking-pin, and a knife mounted in the casing and having operative connection with the spindle.

13. In a device of the character described, the combination with a casing, a spindle, and a knife mounted in the casing and operatively connected to the spindle, of an antifrictional sleeve encircling one end of the casing, roller-bearings interposed between the casing and sleeve, and means for retaining the sleeve and roller-bearing in place.

14. In a device of the character described, the combination with a casing, a spindle, and a knife mounted in the casing and operatively connected to the spindle, said casing being provided with a reduced end having annular roller-channels, annular series of rollers located in the channels, an antifrictional bearing-sleeve surrounding the reduced portion of the casing and having roller-channels accommodating said rollers, and a retaining-disk detachably secured upon the end of the casing to retain the sleeve and bearing-rollers.

15. In a device of the character described, the combination with a casing, and a spindle, of a knife-block mounted in the casing and connected with the spindle, and a knife detachably carried by the knife-block and provided with a flat cutting-face and with a transversely-rounded back edge arranged in angular relation.

16. In combination with the frame carrying the operating mechanism, the slidably-supported rods mounted on the frame, the rotary cutter, and the flexible connection between the operating mechanism and the cutter, said connection being unaffected by the shifting of the frame and rods.

17. In a device of the character described, the combination with a casing having a diametrical slot, of a spindle mounted in the casing, and a knife-block located within the slot and provided with a knife, said knife having an inclined cutting-face and a transversely-rounded back, the face and back being disposed at an angle to each other.

18. In a device of the character described, the combination with a support, of a frame slidably mounted upon the support, operating mechanism mounted on the frame and bodily movable therewith, an extensible shaft having flexible connection with one end of said operating mechanism, and a flue-cutter operatively connected to the opposite end of said shaft.

In testimony that I claim the foregoing as my own I have hereto affixed my signature in the presence of two witnesses.

THOMAS W. HINDE.

Witnesses:
G. L. WATSON,
B. S. CONGER.